W. B. WANKEL.
TOOL HANDLE.
APPLICATION FILED JULY 7, 1909.
953,364.
Patented Mar. 29, 1910.
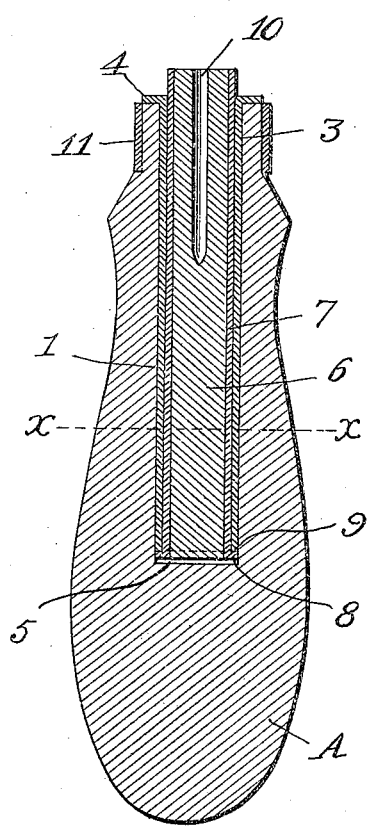
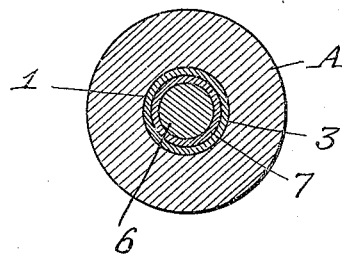
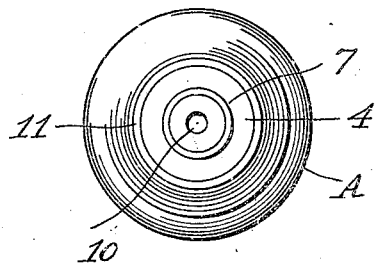
Witnesses
Edwin Frey
A. L. May
Inventor
William B Wankel
By Henry J. Brewington
Attorney

UNITED STATES PATENT OFFICE.

WILLIAM B. WANKEL, OF BROOKLYN, NEW YORK, ASSIGNOR TO MARY J. WANKEL, OF BROOKLYN, NEW YORK.

TOOL-HANDLE.

953,364.  Specification of Letters Patent.  Patented Mar. 29, 1910.

Application filed July 7, 1909. Serial No. 506,381.

*To all whom it may concern:*

Be it known that I, WILLIAM B. WANKEL, a citizen of the United States, residing at the city of Brooklyn, in the county of Kings and State of New York, have invented certain new and useful Improvements in Tool-Handles, of which the following is a specification.

My invention relates to an improvement in tool handles and more particularly to that class of handles used on files and the like, and has for its object to provide a handle wherein the tool may be easily rotated and by reason of such rotation the tool will automatically adjust itself to any surface to which the tool may be applied, thereby equalizing the pressure relative to the surface to be polished, smoothed or refined, thereby effecting a uniform polish, smoothing and refining of the article to which the tool is being applied with a greater degree of certainty and with a less degree of skill on the part of the operator than required in the use of an ordinary rigid file handle.

With the foregoing object in view my invention consists in certain novel features of construction and combinations of parts which will be hereinafter described and pointed out in the claim.

In the accompanying drawings, forming a part of this specification in which like letters and numerals are used to designate similar parts, in the several views: Figure 1 is a sectional elevation of the handle constructed in accordance with my invention; Fig. 2 is a transverse section on the line *x—x* of Fig. 1; and Fig. 3 is an end elevation of the handle.

A represents the body part of the handle made from any suitable material, but preferably of wood, centrally bored at 1, into which is secured a cylindrical casing 3, made from any suitable material, but preferably of metal, having a laterally extended flange 4 extended from the upper end thereof, being extended throughout the bored portion to a predetermined degree short of its length as indicated at 5.

6 is a spindle, around which is driven fitted a cylindrical metal casing 7, having a laterally extended flange 8, provided on the lower end portion thereof; the spindle may be made from any suitable material, but preferably of wood as shown. The spindle is secured within the bored portion 1 of the handle A, by means of the flange 8 of the casing 7 abutting against the lower extremity of the casing 3, as indicated at 9, it being understood that the spindle with the casing 7 secured thereon in the assembling of the parts is first inserted in the bored portion 1, and the casing 3 then inserted within the said bored portion and loosely fitted around the former casing.

In the outer end of the spindle 6 is provided a suitable means for securing the tool in the spindle, such as a slot 10 as shown. The spindle 6 projects beyond the body part of the handle for the purpose of being engaged by some suitable tool (not shown) whereby the spindle may be removed from the handle for purposes of repair.

Secured on the end of the body part A of the handle is a metal ferrule 11, the purpose of which being so well known to those skilled in the art as to demand no further mention here.

Slight changes and alterations might be resorted to in the form and arrangement of the several parts described without departing from the spirit and scope of my invention, and hence I do not wish to limit myself to the exact construction as herein set forth; but, Having fully described my invention, what I claim as new and desire to secure by Letters Patent, is:—

A handle of the character described, comprising a body part, centrally bored a predetermined distance of its length, a metal casing forming a lining secured within said bored portion, and extended short of the length thereof, a spindle, a casing secured around the spindle having a laterally extended flange provided on the lower end thereof, the said flange on the last mentioned casing adapted to engage with the lower end of the first mentioned casing whereby the said spindle is secured revoluble within the said handle, substantially as described.

In testimony whereof I affix my signature in presence of two witnesses.

WILLIAM B. WANKEL.

Witnesses:
  GEORGE MYERS,
  JOHN J. FLOOD.